(12) United States Patent
Culurciello et al.

(10) Patent No.: US 9,858,220 B2
(45) Date of Patent: Jan. 2, 2018

(54) COMPUTING ARCHITECTURE WITH CONCURRENT PROGRAMMABLE DATA CO-PROCESSOR

(71) Applicant: Purdue Research Foundation, West Lafayette, IN (US)

(72) Inventors: Eugenio Culurciello, Lafayette, IN (US); Berin Eduard Martini, Lafayette, IN (US); Vinayak Anand Gokhale, West Lafayette, IN (US); Jonghoon Jin, West Lafayette, IN (US); Aysegul Dundar, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 310 days.

(21) Appl. No.: 14/660,589

(22) Filed: Mar. 17, 2015

(65) Prior Publication Data

US 2015/0261702 A1    Sep. 17, 2015

Related U.S. Application Data

(60) Provisional application No. 61/954,544, filed on Mar. 17, 2014.

(51) Int. Cl.
*G06F 13/20* (2006.01)
*G06F 13/28* (2006.01)
(Continued)

(52) U.S. Cl.
CPC ............ *G06F 13/28* (2013.01); *G06F 9/4411* (2013.01); *G06F 9/46* (2013.01); *G06F 12/023* (2013.01);
(Continued)

(58) Field of Classification Search
USPC ............ 710/305–317, 104, 20–21, 7; 711/147–150, 167–169
See application file for complete search history.

(56) References Cited

U.S. PATENT DOCUMENTS

| | | | | |
|---|---|---|---|---|
| 4,281,398 A | * | 7/1981 | McKenny | G11C 29/80 326/10 |
| 4,999,808 A | * | 3/1991 | Blahut | G06F 7/768 341/55 |

(Continued)

OTHER PUBLICATIONS

Lazebnik, S., et al., "Beyond bags of features: Spatial pyramid matching for recognizing natural scene categories," in Computer Vision and Pattern Recognition, 2006 IEEE Computer Society Conference on, vol. 2, 2006, pp. 2169-2178.

(Continued)

*Primary Examiner* — Raymond Phan
(74) *Attorney, Agent, or Firm* — Purdue Research Foundation

(57) ABSTRACT

A coprocessor (PL) is disclosed. The PL includes a memory router, at least one collection block that is configured to transfer data to/from the memory router, each collection block includes a collection router that is configured to i) transfer data to/from the memory router, ii) transfer data to/from at least one collection router of a neighboring collection block, and iii) transfer data to/from blocks within the collection block, and at least one programmable operator that is configured to i) transfer data to/from the collection router, and ii) perform a programmable operation on data received from the collection router.

20 Claims, 8 Drawing Sheets

(51) Int. Cl.
*G06F 12/02* (2006.01)
*G06F 9/44* (2006.01)
*G06F 9/46* (2006.01)
*G06N 3/063* (2006.01)

(52) U.S. Cl.
CPC ....... *G06N 3/063* (2013.01); *G06F 2212/261* (2013.01); *Y02B 60/1228* (2013.01)

(56) References Cited

U.S. PATENT DOCUMENTS

| | | | | |
|---|---|---|---|---|
| 8,131,935 | B2* | 3/2012 | Arimilli | G06F 12/0811 709/212 |
| 8,874,834 | B2* | 10/2014 | Locasio | G11C 16/349 711/103 |
| 2011/0113199 | A1* | 5/2011 | Tang | G06F 12/0862 711/130 |
| 2011/0131381 | A1* | 6/2011 | Kaplan | G06F 12/0875 711/141 |
| 2012/0047333 | A1* | 2/2012 | Kottapalli | G06F 12/0822 711/146 |
| 2014/0149690 | A1* | 5/2014 | Chirca | H04L 63/0263 711/146 |
| 2016/0034788 | A1* | 2/2016 | Lin | G06K 9/627 382/157 |
| 2016/0085478 | A1* | 3/2016 | Deshpande | G06F 3/0683 711/154 |
| 2016/0322084 | A1* | 11/2016 | Wang | G11C 7/1051 |

OTHER PUBLICATIONS

Bay, H., et al., "Speeded-up robust features (surf)," Comput. Vis. Image Underst., vol. 110, No. 3, pp. 346-359, Jun. 2008.

Serre, et al., "Robust object recognition with cortex-like mechanisms," Pattern Analysis and Machine Intelligence, IEEE Transactions on, vol. 29, No. 3, pp. 411-426, 2007.

Krizhevsky, A., et al., "ImageNet classification with deep convolutional neural networks," Advances in Neural Information Processing Systems, vol. 25, 1-9, 2012.

Sankaradas, M., et al., "A massively parallel coprocessor for convolutional neural networks," in Application specific Systems, Architectures and Processors, 2009. ASAP 2009. 20th IEEE International Conference on, 2009, pp. 53-60.

Cadambi, S., et al., "A programmable parallel accelerator for learning and classification," in Proceedings of the 19th international conference on Parallel architectures and compilation techniques, ser. PACT '10. New York, NY, USA: ACM, 2010, pp. 273-284.

Graf, H. P., et al., "A massively parallel digital learning processor," in Advances in Neural Information Processing Systems 21, D. Koller, D. Schuurmans, Y. Bengio, and L. Bottou, Eds., 2009, pp. 529-536.

Kapasi, U. J., et al., "Programmable stream processors," IEEE Computer, pp. 54-62, Aug. 2003.

Cloutier, J., et al., "Vip: an fpga-based processor for image processing and neural networks," in Microelectronics for Neural Networks, 1996., Proceedings of Fifth International Conference on, 1996, pp. 330-336.

Farabet, C., et al., "Neuflow: A runtime reconfigurable dataflow processor for vision," in Computer Vision and Pattern Recognition Workshops (CVPRW), 2011 IEEE Computer Society Conference on, 2011, p. 109-116.

Cheng, C. et al., "iVisual: An intelligent visual sensor SoC with 2790 fps CMOS image sensor and 205 GOPS/W vision processor," Solid-State Circuits, IEEE Journal of, vol. 44, No. 1, pp. 127-135, 2009.

Kim, J., et al., "A 201.4 GOPS 496 mW real-time multi-object recognition processor with bio-inspired neural perception engine," IEEE Journal of Solid-State Circuits, vol. 45, No. 1, 32-45, Jan. 2010.

Lee, S., et al., "A 345 mW heterogeneous many-core processor with an intelligent inference engine for robust object recognition," IEEE Journal of Solid-State Circuits, vol. 46, No. 1, 42-51, Jan. 2011.

Tanabe, Y., et al., "A 464gops 620gops/w heterogeneous multi-core soc for image-recognition applications," in Solid-State Circuits Conference Digest of Technical Papers (ISSCC), 2012 IEEE International, 2012, pp. 222-223.

Tsai, C., et al., "A 1.0 tops/w 36-core neocortical computing processor with 2.3tb/s kautz noc for universal visual recognition," in Solid-State Circuits Conference Digest of Technical Papers (ISSCC), 2012 IEEE International, 2012, pp. 480-482.

Oh, J., et al., "A 320mw 342gops real-time moving object recognition processor for hd 720p video streams," in Solid-State Circuits Conference Digest of Technical Papers (ISSCC), 2012 IEEE International, 2012, pp. 220-222.

Park, S. et al., "A 32.8mW 60fps cortical vision processor for spatio-temporal action recognition," in Circuits and Systems (ISCAS), 2013 IEEE International Symposium on, 2013, pp. 1002-1005.

Hanai, Y., et al., "A versatile recognition processor employing haar-like feature and cascaded classifier," in Solid-State Circuits Conference—Digest of Technical Papers, 2009. ISSCC 2009. IEEE International, 2009, pp. 148-149, 149a.

Farabet, C., et al., "Hardware accelerated convolutional neural networks for synthetic vision systems," in Circuits and Systems (ISCAS), Proceedings of 2010 IEEE International Symposium on, 2010, pp. 257-260.

* cited by examiner

COMPUTING ARCHITECTURE WITH CONCURRENT PROGRAMMABLE DATA CO-PROCESSOR

CROSS-REFERENCE TO RELATED APPLICATIONS

The present U.S. patent application is related to and claims the priority benefit of U.S. Provisional Patent Application Ser. No. 61/954,544, filed Mar. 17, 2014, the contents of which are hereby incorporated by reference in their entirety into the present disclosure.

GOVERNMENT SUPPORT CLAUSE

This invention was made with government support under N00014-10-1-0278 and N00014-12-1-0167 awarded by the Office of Naval Research. The government has certain rights in the invention.

TECHNICAL FIELD

The present disclosure generally relates to computing architectures, and in particular to an architecture with at least one concurrent programmable data co-processor.

BACKGROUND

This section introduces aspects that may help facilitate a better understanding of the disclosure. Accordingly, these statements are to be read in this light and are not to be understood as admissions about what is or is not prior art.

Artificial vision systems find applications in autonomous robots, security systems, micro-unmanned aerial vehicles (UAVs) and more recently, mobile phones and automobiles. These applications require algorithms that can recognize objects with a high degree of accurately while being able to execute instructions in real time. Many recent algorithms that are promising for visual understanding are computationally very expensive and cannot be run in real-time without custom hardware or power-hungry graphics processing units. The latter are not suitable for mobile, low-power platforms. Scale-invariant feature transform (SIFT) and Speeded Up Robust Features (SURF) feature extractors, hierarchical models of the visual cortex (HMAX), and deep convolutional neural networks (DCNNs) work best for scene understanding. Recent work on DCNNs, which consist of hundreds of convolution maps across multiple layers, has shown that these models achieve higher accuracy than others for high level feature extraction.

DCNNs are a class of models that form a powerful tool to help solve visual classification problems. DCNNs consist of multiple layers of convolutions, each comprising between tens and hundreds of filters. Each convolution layer is interspersed by one sub-sampling and non-linearity operator. Referring to FIG. 1, a schematic representation of the complexity and thereby computational cost of convolutions is depicted. As seen in FIG. 1, convolutions are computationally costly, with frames spending over ninety percent of their time being processed by the filter kernels. For example, the method discussed in one related work uses five convolution layers, each with roughly three hundred filters. In the first layer, convolutions are used to extract low-level features, such as edges and textures. Deeper layers aim at combining the features extracted by the previous layers to achieve a higher level of abstraction and detect more complex features. After each convolution layer, DCNNs use a spatial pooling layer to provide the network with scale invariance. Spatial pooling also results in subsampling the image which reduces the number of computations required in latter layers. Max-pooling is a type of spatial pooling that has recently become popular. Finally, a sigmoid or non-linearity operation serves as an activation function.

Artificial vision systems represent only one set of applications that can benefit from a flexible programmable computing architecture that while improves efficiency can also reduce cost, especially in applications where computing resources are scarce. A typical platform for developing such architectures is a field programmable gate array (FPGA) platform.

Hardware accelerated vision systems implemented on FPGAs are known. Known methods require a host computer with a personal computer interface (PCI) connection in order to function. These cannot be embedded inside of small and lightweight micro-UAVs or mobile robots. Furthermore, as the FPGA requires a host computer in order to function, the actual power consumed by the entire system is a combination of the power consumed by the FPGA and the host which can be significantly higher than the consumption of the FPGA alone. Finally, these designs require large off-chip memories of their own as the communication bottleneck over PCI when using the host's memory would decrease performance.

Similar streaming architectures have been designed to meet the computational demands of DCNNs; for example the method according to one related art demonstrates the application of one such system. Their design on fully programmable logic benefits from flexibility and parallelism and also does away with the memory bottleneck by using the on-board double data rate (DDR3) memory, but it suffers from slow host-coprocessor data transfer.

Despite the recent improvements in computing architectures, there remains an unmet need to provide a degree of flexibility and efficiency with shared memory architecture where the same memory can be accessed by both software and the FPGA and requires no other system in order to function while maintaining a low level of power consumption.

SUMMARY

A coprocessor (PL) is disclosed. The PL includes a memory router that is configured to i) transfer data to/from an external memory device, the transfer of data being initiated by an external processing system (PS) and ii) distribute the data to a plurality of blocks within the PL. The PL further includes at least one collection block that is configured to transfer data to/from the memory router. Each collection block includes a collection router that is configured to i) transfer data to/from the memory router, ii) transfer data to/from at least one collection router of a neighboring collection block, and iii) transfer data to/from blocks within the collection block. The collection block further includes at least one programmable operator that is configured to i) transfer data to/from the collection router, and ii) perform a programmable operation on data received from the collection router. The PL unit is configured to perform programmable operations on data transferred from the external memory and provide the operated-on data to the external memory with substantially zero overhead to the PS.

DETAILED DESCRIPTION

Figure 1:
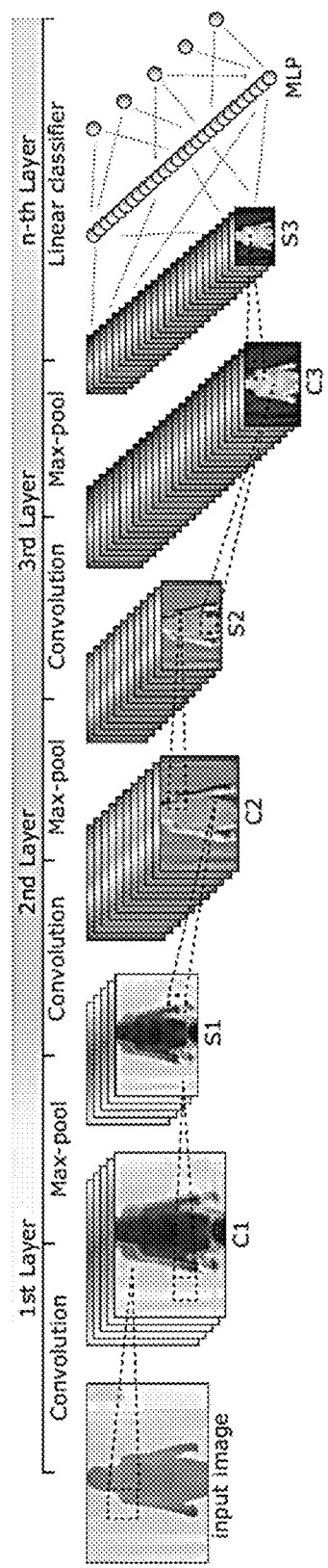
FIG. 1 is a schematic representation of a convolution and the represented complexity and computational cost of such mathematical operations.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2:
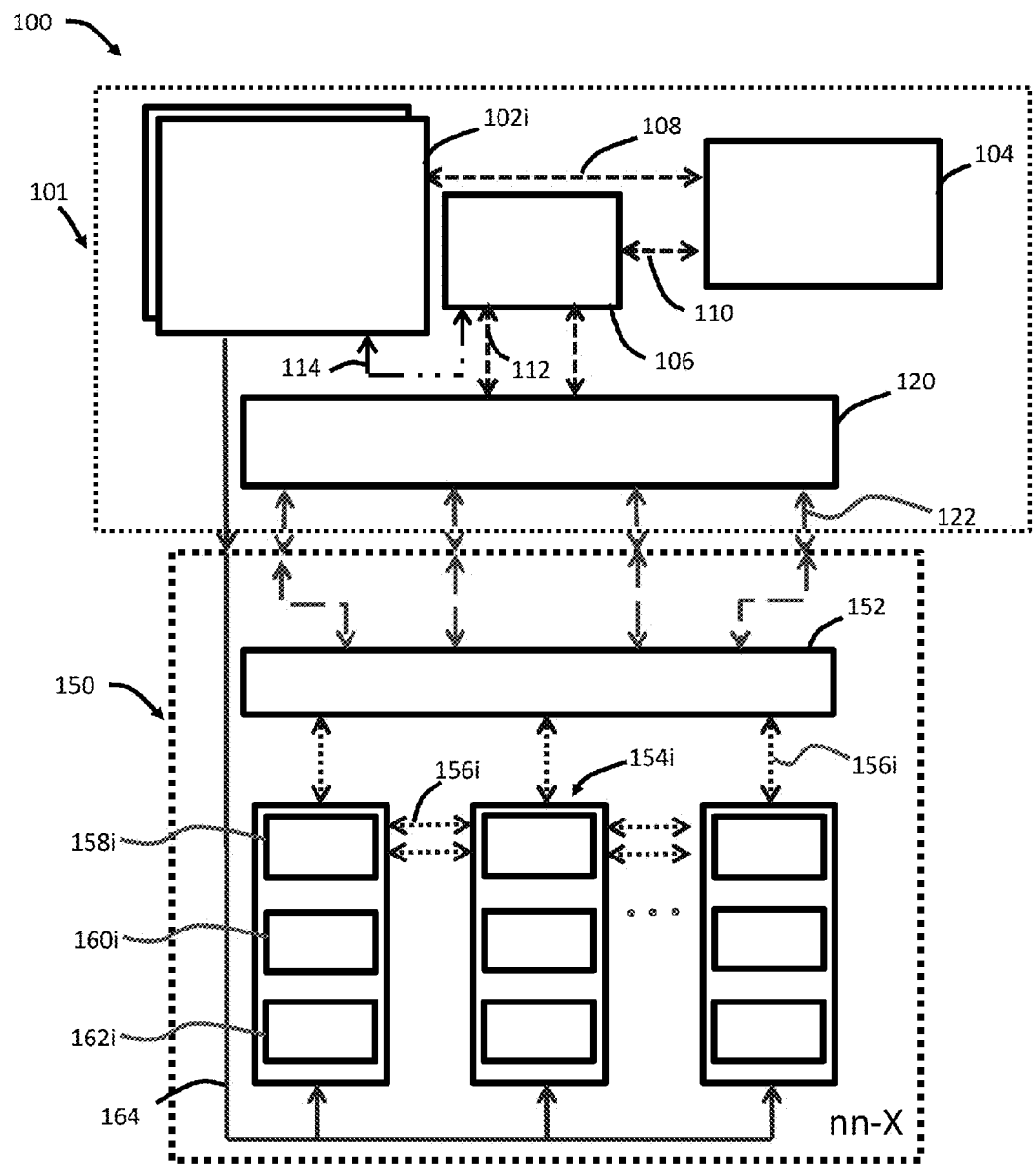
FIG. 2 is a block diagram depicting a coprocessor, according to the present disclosure.

A novel computing architecture with a concurrent programmable data co-processor is presented in the present disclosure. Referring to FIG. 2, a processing arrangement 100 is presented including a processing system 101 and a novel coprocessor (nn-X) 150.

In the exemplary embodiment presented in FIG. 2, the processing system (PS) 101 comprises one or more processing cores 102$i$ (or simply cores 102$i$), e.g., ARM processors, and associated peripherals, e.g., universal asynchronous receiver/transmitter (UART), universal serial bus (USB), ethernet, etc., (not shown). Each core 102$i$ may have a dedicated memory (not shown), e.g., a 32 KB split L1 (data and instruction) cache, while a unified memory block (not shown), e.g., a 512 KB L2 cache, may be shared by more than one core 102$i$. Each core 102$i$ may have its own single instruction multiple data (SIMD) unit. It should be appreciated while two cores 102$i$ are shown; the PS 101 can include more cores or simply a general purpose central processing unit. The cores 102$i$ interface with external memory 104 utilizing a memory controller 106 which can transfer data from the external memory 104 to the cores 102$i$ via a memory bus 114 and off-chip bus 110. Alternatively, the cores 102$i$ can communicate with the external memory via an off-chip bus 108 where data is communicated directly from the memory 104 to the cores 102$i$. The memory controller 106 may be configured to have a direct memory access (DMA) for continuous communication of stream of data between the external memory 104 and the cores 102$i$ or as will be described in more detail below to the coprocessor 150. The memory controller 106 interfaces with a memory interconnect 120 via an on-chip bus 112. The memory interconnect 120 communicates with the coprocessor 150 via channels 122. The cores 102$i$ can also communicate with the coprocessor 150 via a bus 164.

According to FIG. 2, the coprocessor 150 is divided into two main areas—the memory router 152 and the operators identified as collection units 154$i$ for processing images and other complex calculations. The memory router 152 interfaces with the DMA engine in the memory controller 106 and can be configured to multiplex the incoming data streams to one or more collection units below. One of the collection units 154$i$ can be stalled if an associated data stream is temporarily delayed, e.g., if the DMA engine in the memory controller 106 has been temporarily taken out of communication with the collection unit 154$i$.

A field programmable gate array (FPGA) chip can be configured to deploy one or more collection units 154$i$. Each of the collection units 154$i$ can be run in parallel, as can blocks contained within them (router 158$i$, multiply accumulate operator (MAC) 160$i$, and configurable block 162$i$). Collection units 154$i$ can also exchange data between them via data channels 156$i$ without having to send the data to the memory router. While three collection units are depicted in FIG. 2, it should be appreciated that less or many more can be networked in the coprocessor 150. Furthermore, the n$^{th}$ collection unit 154$_n$ can be coupled to the first collection unit 154$_1$ in a circular fashion allowing data to be shared between the n$^{th}$ unit and the first unit.

In one exemplary embodiment, the coprocessor 150 includes a XILINX ARTIX-7 FPGA. The high performance (HP) ports tap into double data rate (DDR3) memory using the advanced extensible interface (AXI) 4 bus. Three slave AXI DMA engines use two 32-bit channels each to interface with the HP ports. These DMA engines can output one 32-bit "pixel" per clock cycle.

As shown in FIG. 1, the deep convolutional neural networks (DCNNs) are hierarchical models. Therefore, the output of one operator can be sent in as the input of the next as soon as it is available. The output does not need to be written to memory between operations as long as the next operator is available. If the next operator is occupied by another data stream, the output is then sent to memory. This arrangement exploits macro parallelism in that multiple operators perform their tasks in parallel, without requiring to wait for the entire image to be processed by one before being sent to the next.

Consequently, and according to the present disclosure, in order to improve efficiency of the DCNNs, each collection unit 154$i$ includes a router 158$i$, optionally one MAC 160$i$, and at least one programmable operator block (identified as f(x)) 162$i$. The router 158$i$ in each collection unit 154$i$ is coupled to each of the other blocks in the respective collection units 154$i$ and to a router 158$i$ block of a neighboring collection unit 154$i$, as well as being coupled to the memory router 120 which in turn can route data from the external memory 104 to the collection units 154$i$ without overhead incurred by the PS 101.

The programmable operator blocks 165$i$ can be programmed to carry out a plurality of operations, including but not limited to, convolver (a convolution operator for convolving two series), max pooling (finding a maximum value associated with a series), pixel-wise subtraction (a subtraction operator for subtracting pixel values for pixels or other parameters), pixel-wise addition (an addition operator for adding pixel values for pixels or other parameters), pixel-wise multiplication (a multiplication operator for multiplying pixel values for pixels or other parameters), pixel-wise division (a division operator for dividing pixel values for pixels or other parameters), nonlinear operation (an operator that applies a non-linear curve, e.g., a sigmoid curve, to a series of pixels or other parameters), and combinations thereof.

The novel architecture includes a pipelined, low-powered mobile platform for accelerating DCNNs amongst other computing algorithms and arrangements. An exemplary system was implemented on a XILINX ZYNQ-7000 ALL-PROGRAMMABLE system on chip (SOC). This exemplary platform allows for efficient hardware/software partitioning due to its shared DDR3 memory. The ZYNQ is a shared memory architecture that has synchronous access to memory through both software (PS) and hardware (PL). DCNNs produce hundreds (and in some network architectures, thousands) of intermediate results that need to be streamed out to memory, where they await their turn to be processed by latter network layers or combined (pixel-wise addition) with other intermediate results. This constant need to send data back and forth between memory and co-processor dictates for a high bandwidth, the lack of which could choke performance. In accordance with the present disclosure, this performance issue was address by using three HP ports to DDR3 memory that give an exemplary combined bandwidth of 1 GB/s in full-duplex. The HP ports use the AMBA4 AXI standard to communicate with memory.

The operation of the exemplary embodiment of FIG. 2 is now described. This system uses a Q8.8 fixed point number format. Inputs and outputs appear as data streams for all modules.

Convolver: The two dimensional convolution operator is the essence of DCNNs. This system's convolution engine can perform the following operation in one clock cycle.

$$y_{ij} = \sum_{m=1}^{n}\sum_{l=1}^{n} x_{i+m,j+l} w_{ml} \quad (1)$$

In equation 1, $y_{ij}$ is the output, $x_{ij}$ is the value of an input pixel and $w_{ij}$ is the value of the n×n filter kernel, where 3≤n≤10. Henceforth, "convolution" will be used to refer to the convolution operation being performed over the entire image while "one convolution" will refer to the operation required to produce one output pixel. The kernel is pre-loaded from memory and cached for the duration of the convolution. As the image is streamed in, one input pixel results in one output pixel, not including an initial set up delay that occurs due to the pipelined nature of the hardware. This results in 2×n×n operations per clock cycle, one n×n for a point to point multiplication of the kernel with the image and one n×n for adding the results of the multiplication. This results in micro parallelism—parallel operations performed within an operator.

Max-pooler: Spatial max-pooling, which is similar to the firing mechanism of a neuron, is a winner-takes-all function that returns the maximum value over a spatial region of the input image. This operation is described in equation (2):

$$z_{(i+1),j} = \max\begin{pmatrix} x_{si+1,sj+1} & \cdots & x_{si+1,sj+p} \\ \vdots & \ddots & \vdots \\ x_{si+p,sj+1} & \cdots & x_{si+p,sj+p} \end{pmatrix} \quad (2)$$

where the pooling region is p×p with a stride of s. The maxpooler returns an image that is subsampled by a factor of p in both dimensions if s is equal to p. In most DCNNs, this output is fed to a non-linearity.

Non-Linear operator: The non-linear operator is implemented by producing linear approximations of non-linear functions. The input domain is divided into segments, and each segment executes a linear mapping by using the following formula—

$$g(x) = a_m x_{ij} + b_m \text{ for } x_{ij} \in [l_m, l_{m+1}) \quad (3)$$

where $l_m$ specifies the lower bound of the $m^{th}$ segment, $a_m$ and $b_m$ are the slope and y-intercept of said segment, respectively. This operation generates some quantization noise but this can be minimized by using a larger number of linear segments. The non-linear operator also produces one output per clock cycle.

In the system according to the present disclosure, all the operators and routers can be configured in real-time via the configuration bus shown in FIG. 2. Each module operates independently which means configuring one module does not require stalling any others. For example, a convolution can proceed while the non-linear operator is being configured from a hyperbolic tangent to a square root function.

Parallelism of the hardware according to the present disclosure is mostly obtained by the convolution engines in each collection (FIG. 2). These get mapped to DSP slices inside of the FPGA. The mobile platform used in this work contains 85 k logic cells and 220 DSP slices. The DSP units limit this hardware and future work will use a larger platform that will allow adding up to six collections. Currently, our platform runs at 100 MHz. Performance is linearly related to the operating frequency. Future work on this platform will involve increasing operating frequency by using two clock domains. The collections would run on the faster clock.

Figure 3:
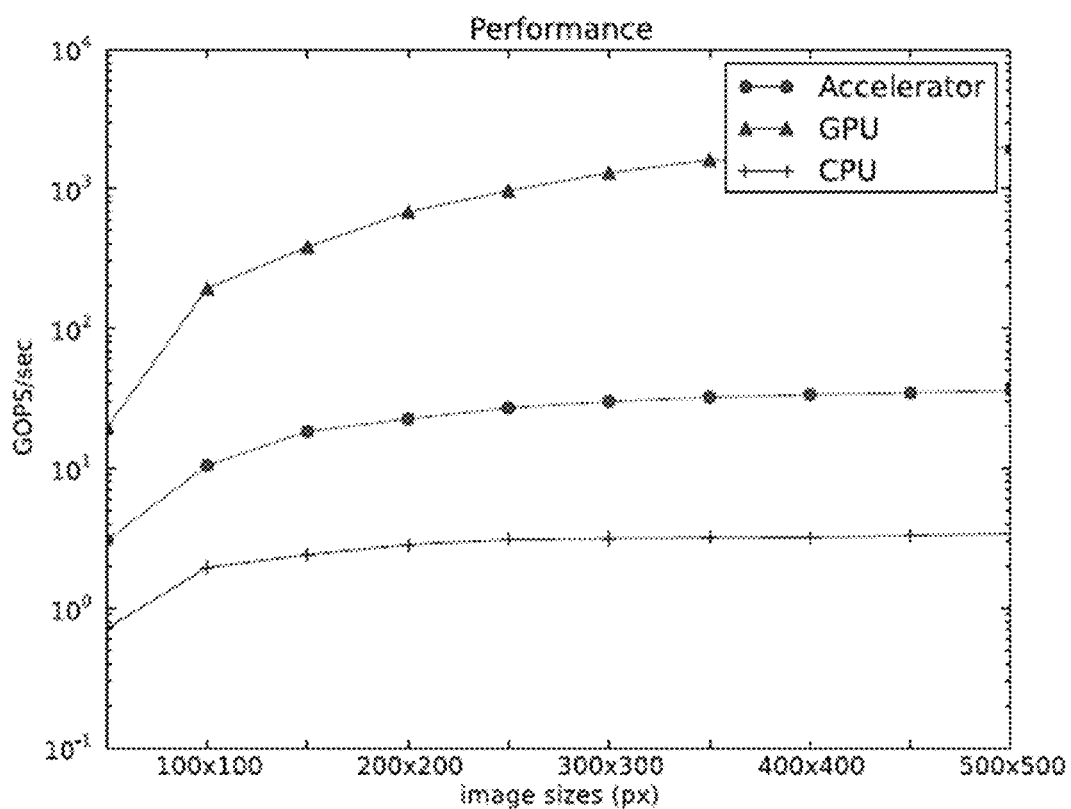
FIG. 3 is a graph of GOPS/sec for various image sizes.

The performance of this system is compared to a system running a mobile INTEL processor and a state-of-the-art graphics processing unit (GPU). The benchmark was a full loop consisting of convolutions, max-pooling and non-linearity. The test involved running architectures that would enable full utilization of each platform's resources. These results are reported in FIGS. 3 and 4. A 9×9 convolution filter followed by 2×2 max-pooling and hyperbolic tangent for a single full-loop over 500×500 input image requires about 48.67 million operations. Performance per second and performance per watt are used as metrics for comparison. Should be noted that the y-axis is a log-scale for both plots.

Figure 4:
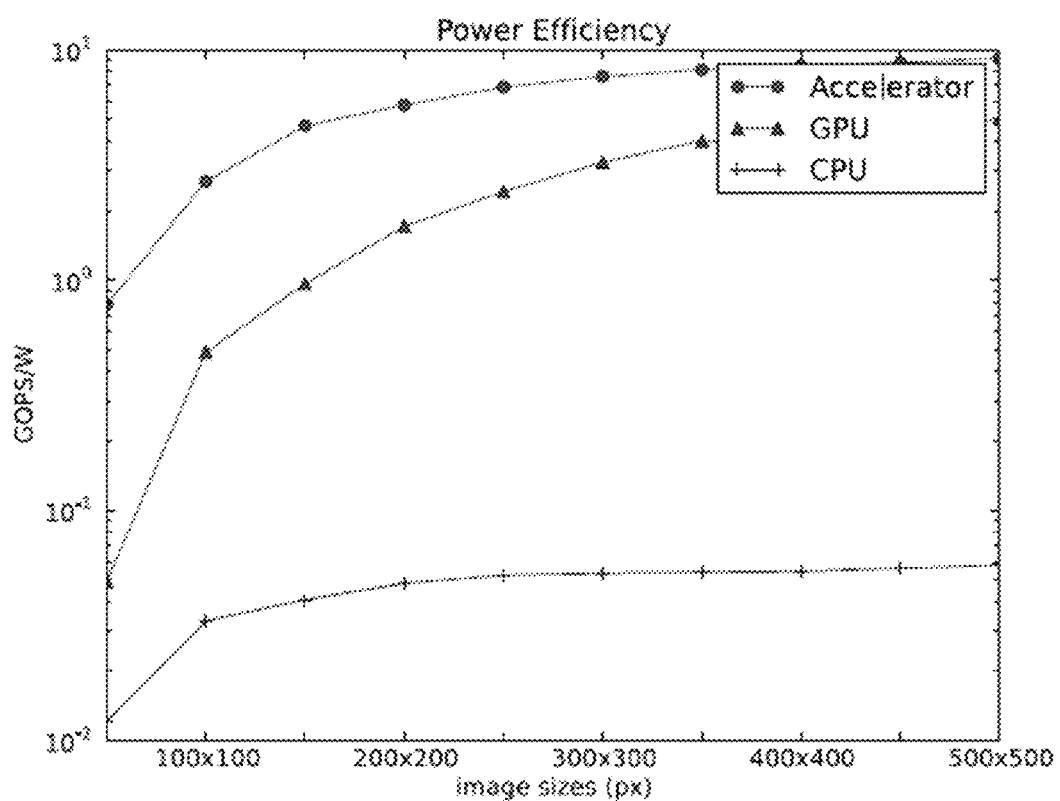
FIG. 4 is a graph of GOPS/W for various image sizes.

FIG. 4 demonstrates power efficiency of the platforms based on the performance per unit watt. The GPU can exploit massive parallelism but also consumes significantly more power than the other systems. Our system records the highest performance per watt.

The central processing unit (CPU) was an INTEL CORE i7 3720QM processor. The power consumption when running the benchmark was measured to be 59.3 watts. The GPU used was an NVIDIA GEFORCE GTX 780. This GPU's power consumption was measured to be 400 watts. The hardware consumed a maximum of 3.9 watts. The benchmark aimed at maximizing the utilization of all platforms so as to record peak performance possible in each case.

According to the present disclosure, an nn-X in a 45 nm IBM silicon on insulator (SOI) process has been developed and demonstrated, and subsequently have measured data on such technology node. In the IBM process, nn-X die size was 1 mm×2 mm for a 4-collections system capable of 320 G ops/s, and consuming 250 mW (measured data).

Measured data for FPGA device prototypes are discussed blow. Estimates for 22 and 14 nm technologies are also discussed below. These estimates are derived from an nn-X prototype in the 45 nm IBM SOI process. These estimates predict performance scaling with the technology node, and assuming optimized device layouts.

Figure 5:
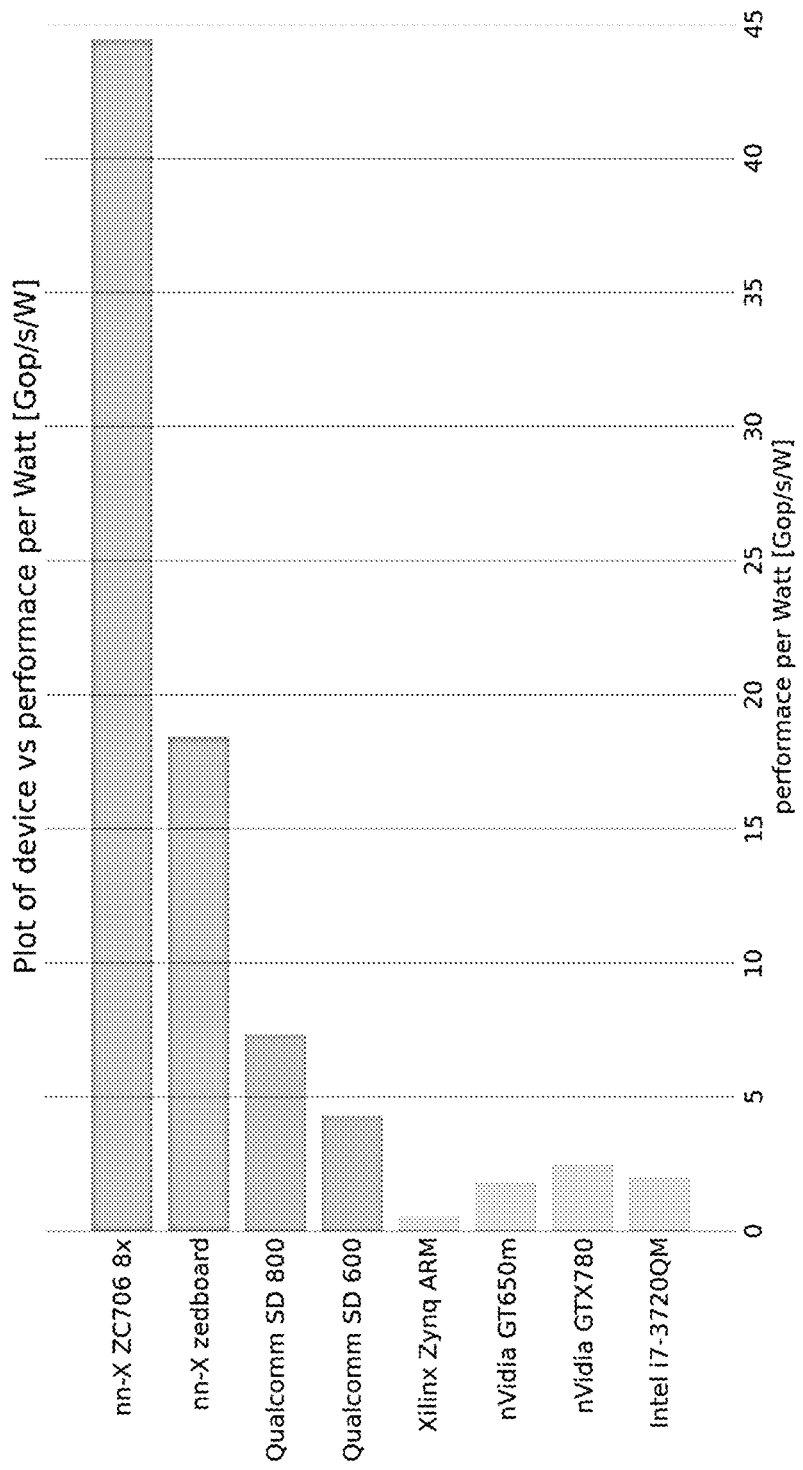
FIG. 5 is a plot of various devices vs. performance per watts.

FIG. 5 shows performance per watt for various platforms. FIG. 5 depicts nn-X according to the present disclosure advantage in efficient processing (billion-operations per watt of electrical power, or G-ops/W) as compared to multiple devices currently on the market. These devices include a desktop processor and a desktop and mobile graphical process (INTEL I7, nVIDIA GPUs), all of which are about 2 G-ops/W. Recent mobile processors like QUALCOMM SNAPDRAGON chipsets are slightly better, on the order of 5 G-ops/W. nn-X coprocessor according to the present disclosure with 4 computational collection units (see FIG. 2, 154i) can deliver more than 20 G-ops/W. This advantage is even more surprising given that these numbers are for an FPGA prototype, while the other devices in this comparisons are all SoC.

Figure 6:
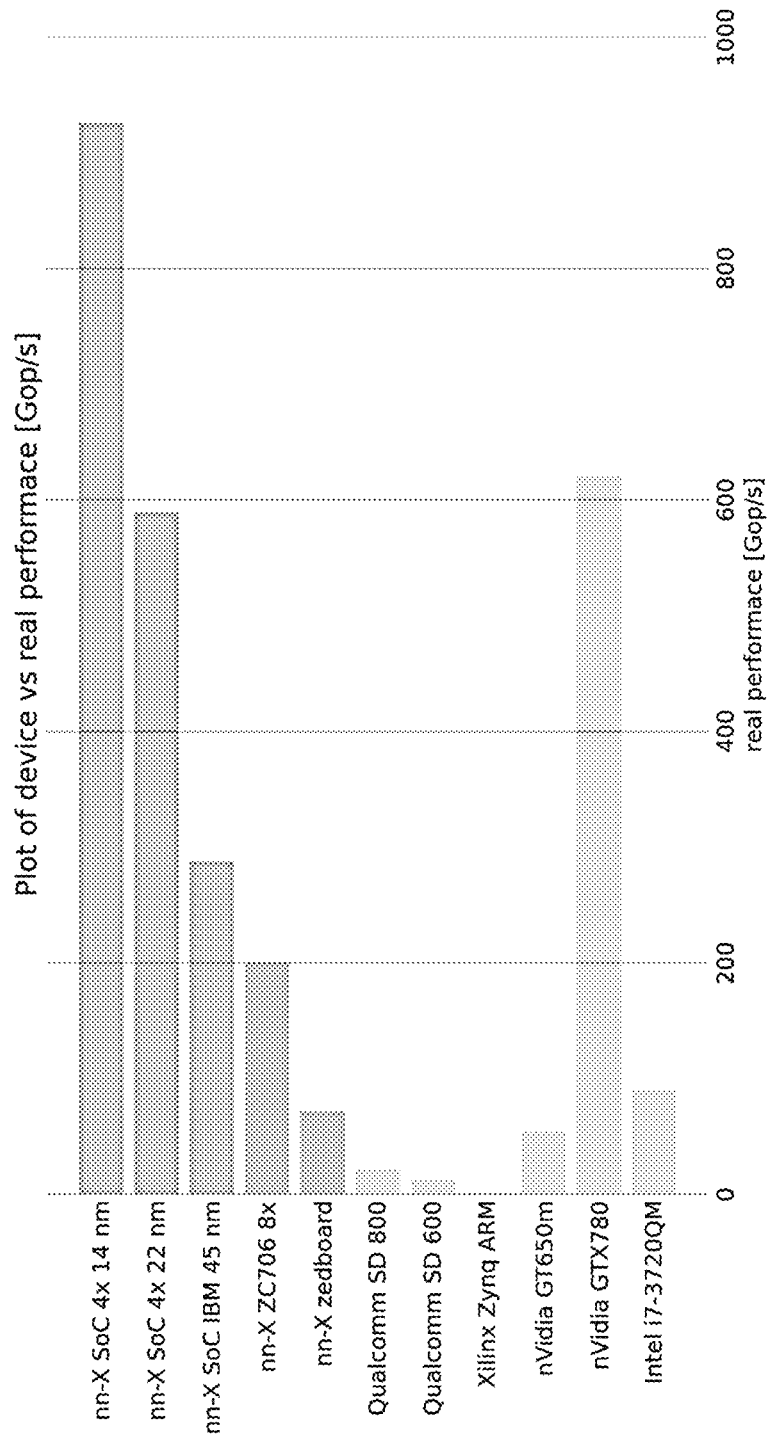
FIG. 6 is a plot of various devices vs. performance measured in GOPS/sec.
Figure 7:
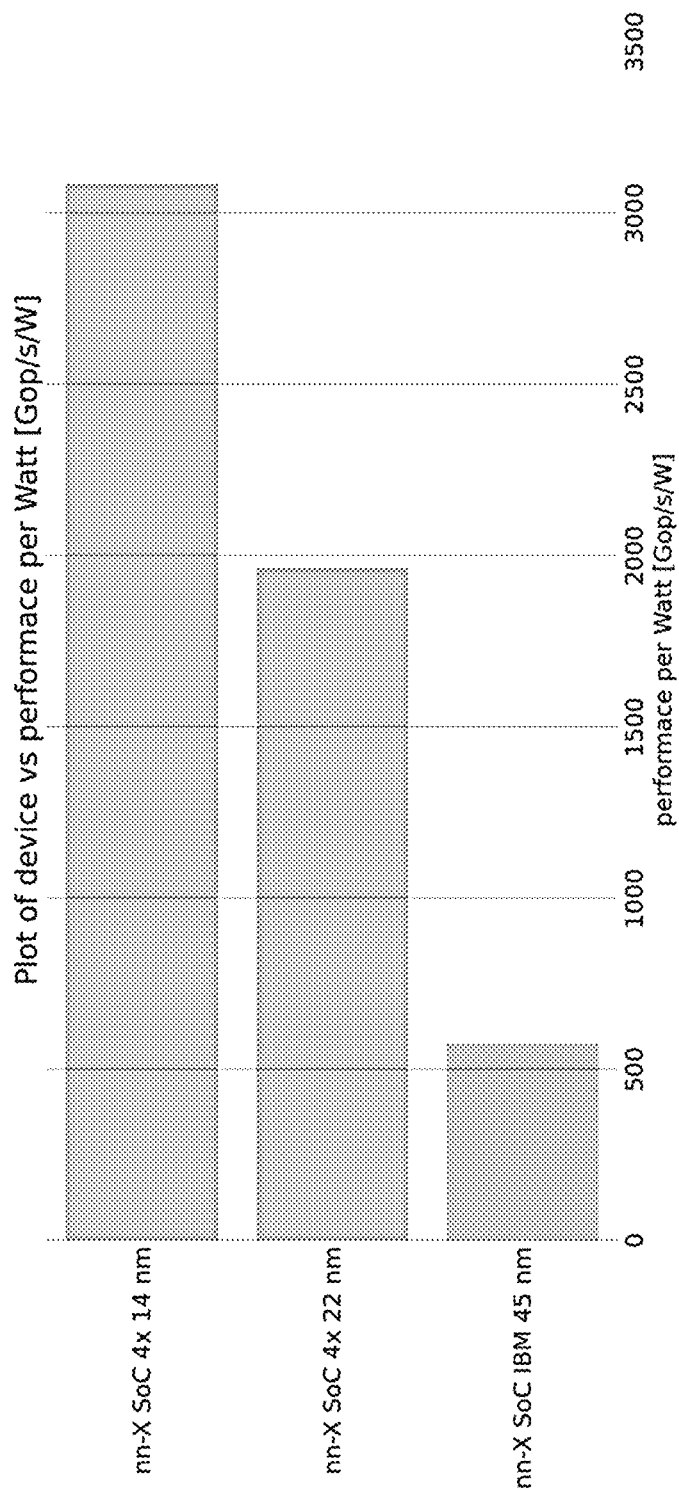
FIG. 7 is a plot of various devices vs. performance measured per Watt (GOPS/sec/W).
Figure 8:
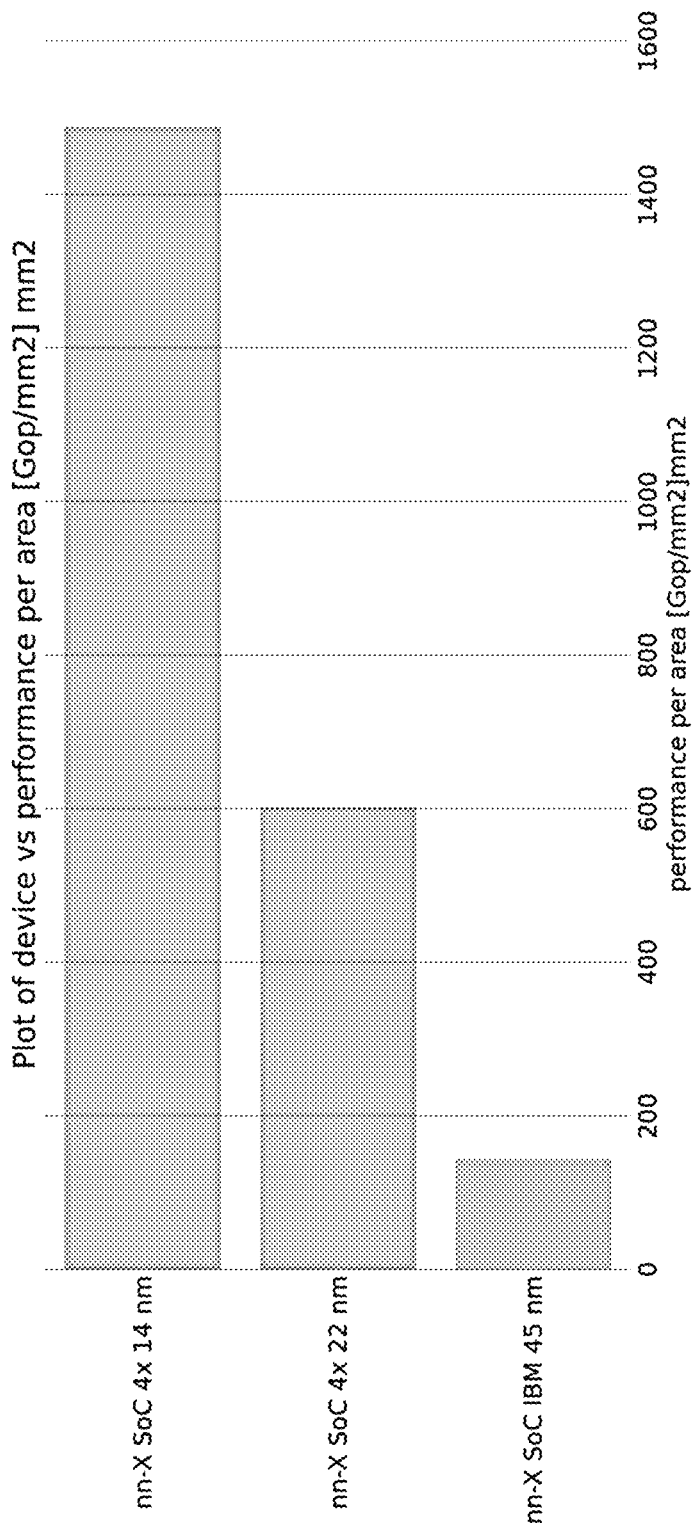
FIG. 8 is a plot of various devices vs. performance measured per area (GOPS/mm$^2$).

When we compare nn-X implemented as a digital integrated microchip, or an SoC, the advantages are far greater. FIG. 6 provides a reporting of nn-X SoC performance in pure raw computational performance of billion operations per second, or G-ops/s. nn-X Soc is here compared to a variety of leading desktop and mobile devices. These devices include a desktop processor and desktop graphical process (INTEL 17, nVIDIA GPUs), which deliver respectively more than 100 and 600 G-ops/s, and far surpass all other mobile devices. On the other hand, nn-X SoC implemented in 22 and 14 nm have respectively a performance that is similar and higher than a leading desktop GPU (nVIDIA GTX780).

nn-X SoC advantage in efficient processing (Billion-operations per watt of electrical power, or G-ops/W) as compared to multiple devices currently on the market is even higher than the figures for pure performance in G-ops/s. The figure below reports nn-X performance divided by electrical power consumption in G-ops/W. nn-X implemented in SoC (red) is more up to 1000× better than a variety of leading desktop and mobile devices. nn-X SoC has the largest performance per power of any device currently on the market, as shown in FIG. 7.

nn-X benefits come in a small package. nn-X SoC implemented in 22 and 14 nm technologies is less than 2 mm$^2$ of silicon area. This small footprint makes it ideal as a co-processor in a large mobile SoC, because the relative increase of chipset area is negligible compared to the size of current mobile chipsets (~10×10 mm), and the advantages mentioned above. FIG. 8 provides a reporting of nn-X performance divided by microchip silicon area in Gops/mm$^2$. This figure is for nn-X SoC.

Those skilled in the art will recognize that numerous modifications can be made to the specific implementations described above. The implementations should not be limited to the particular limitations described. Other implementations may be possible.

The invention claimed is:

1. A coprocessor (PL) unit, comprising:
    a memory router configured to i) transfer data to/from an external memory device, the transfer of data being initiated by an external processing system (PS) and ii) distribute the data to a plurality of blocks within the PL unit; and
    at least one collection block configured to transfer data to/from the memory router, each collection block including
        a collection router configured to i) transfer data to/from the memory router, ii) transfer data to/from at least one collection router of a neighboring collection block, and iii) transfer data to/from blocks within the collection block,
        at least one programmable operator configured to i) transfer data to/from the collection router, and ii) perform a programmable operation on data received from the collection router,
    the PL unit configured to perform programmable operations on data transferred from the external memory and provide the operated-on data to the external memory with substantially zero overhead to the PS.

2. The PL unit of claim 1, the at least one collection block further comprising:
    at least one multiply-accumulator (MAC) block configured to i) transfer data to/from the collection router, ii) transfer data to/from the at least one programmable operator, and iii) perform multiply and accumulate operations on data received from the collection router and/or the at least one programmable operator.

3. The PL unit of claim 1, the programmable operation performed by the programmable operator includes max-pooling operations.

4. The PL unit of claim 1, the programmable operation performed by the programmable operator includes pixel-wise subtraction operations.

5. The PL unit of claim 1, the programmable operation performed by the programmable operator includes pixel-wise addition operations.

6. The PL unit of claim 1, the programmable operation performed by the programmable operator includes pixel-wise multiplication operations.

7. The PL unit of claim 1, the programmable operation performed by the programmable operator includes pixel-wise division operations.

8. The PL unit of claim 1, the programmable operation performed by the programmable operator includes non-linear operations.

9. The PL unit of claim 1, the programmable operation performed by the programmable operator includes MAC operations.

10. The PL unit of claim 1, the programmable operation performed by the programmable operator includes non-linear operations.

11. The PL unit of claim 1, the at least one collection unit is implemented based on field programmable gate array technology.

12. The PL unit of claim 1, the at least one collection unit is implemented based on field programmable gate array (FPGA) technology.

13. The PL unit of claim 1, the at least one collection unit is implemented based on application specific integrated circuit (ASIC) technology.

14. The PL unit of claim 1, the PL unit includes a plurality of collection units.

15. The PL unit of claim 1, the PL unit includes at least 50 collections units.

16. The PL unit of claim 1, the PL unit includes at least 5 collections units.

17. The PL unit of claim 1, the PL unit includes at least 5 collections units.

18. The PL unit of claim 2, the collection router is further configured to transfer data to/from the at least one MAC.

19. The PL unit of claim 10, the non-linear operations include applying a sigmoid function to a series.

20. The PL unit of claim 18, the at least one programmable operator further configured to perform a programmable operation on data received from the at least one MAC.

* * * * *